June 23, 1959 E. H. GATZERT 2,892,038

LINE ADAPTER CIRCUIT FOR SPECIAL TELEPHONE SERVICE

Filed May 7, 1957 2 Sheets-Sheet 1

INVENTOR
ERNEST H. GATZERT
BY Francis E. Blake
ATTORNEY

LINE ADAPTER CIRCUIT FOR SPECIAL TELEPHONE SERVICE

Filed May 7, 1957 2 Sheets-Sheet 2

United States Patent Office 2,892,038

Patented June 23, 1959

2,892,038

LINE ADAPTER CIRCUIT FOR SPECIAL TELEPHONE SERVICE

Ernest H. Gatzert, Rochester, N.Y., assignor to General Dynamics Corporation, Rochester, N.Y., a corporation of Delaware Application May 7, 1957, Serial No. 657,681

8 Claims. (Cl. 179—27)

Figure 1:
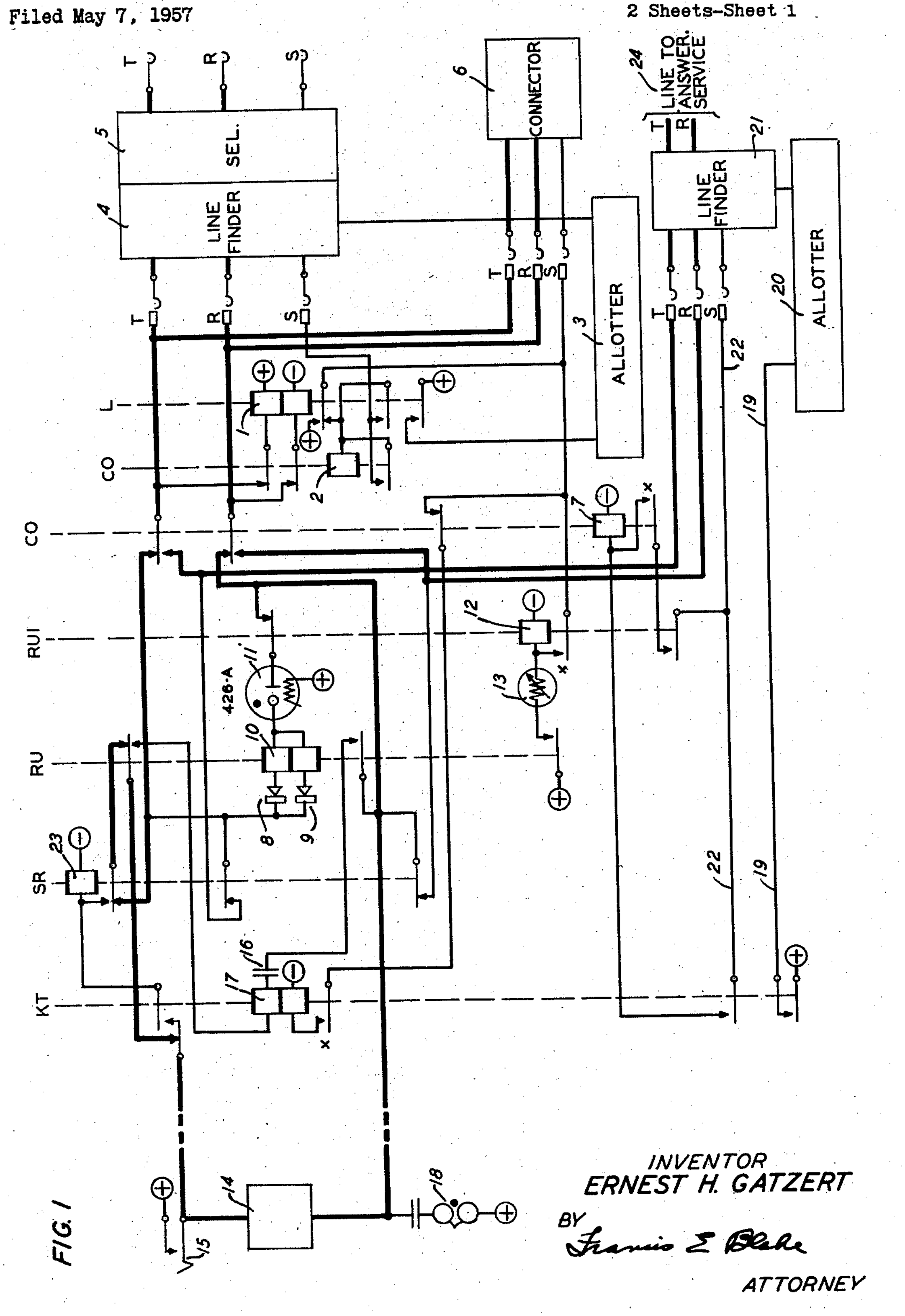

This invention relates to switching systems and particularly to means provided in telecommunication systems for giving special service to individual subscribers.

The object of the invention is to provide a very simple and economical arrangement whereby a subscriber may have incoming calls switched to lines leading to operators assigned to duty as answering agents.

In accordance with this invention a line adapter circuit containing an incoming call responsive means is provided to enable a line finder arrangement which will thereupon pick up the incoming call and extend the line to an answering service.

In accordance with one form of this invention, a line adapter circuit is provided containing a ringing current responsive relay which will respond to an incoming call and then eliminate itself from the circuit for the duration of the call, such relay thus being momentarily operated. During this short operation a circuit is offered to a testing relay which responds if the subscriber has marked his line for the diversion of all incoming calls and which will not respond otherwise. When such testing relay responds it activates an answering service whereby a line finder will immediately seek the line and divert the call to the special operator's lines.

Despite the said operations, the subscriber's station bell will also respond and the subscriber, if he wishes, may answer the incoming call even though he cannot prevent the extension of his line also to the answering service.

By removing the said station marking, the subscriber may condition his line to prevent the operation of the answering service means. The ringing current responsive means in the said adapter circuit will operate but since the test relay cannot be energized the line finder equipment for the answering service cannot be started.

A feature of the invention is an adapter circuit for a subscriber's line including a test relay which will respond only when the said line is marked at the substation to divert incoming calls to an answering service.

Another feature of the invention is a circuit arrangement in an adapter circuit for sampling the incoming calling signal and for immediately freeing the line so that such signal unimpeded may be transmitted to the substation until the call is answered, either by the answering service or by the subscriber or by both.

In accordance with another form of the invention, a circuit arrangement is provided in which the subscriber is provided with no additional substation apparatus but may nevertheless and merely by a prompt answer to an incoming call, prevent the diversion thereof to the answering service. This arrangement consists of an adapter circuit having the same means as before to enable a line finder arrangement to pick up the incoming call but is additionally provided with counting means for delaying this enablement until a given number of applications of ringing current has been made so that if the subscriber who may be at his telephone answers promptly, his incoming call will not be diverted.

Specifically this embodiment of the invention is provided with what has been called a dipper and bucket circuit by which a condenser is used to cause an enablement operation and in which the said condenser is charged up to the level necessary by charges transferred from another condenser. Thus the conventional applications of ringing current to the called line may be counted so that if the called subscriber does not answer promptly, his call may be diverted to an answering service.

Other features will appear hereinafter.

Figure 2:
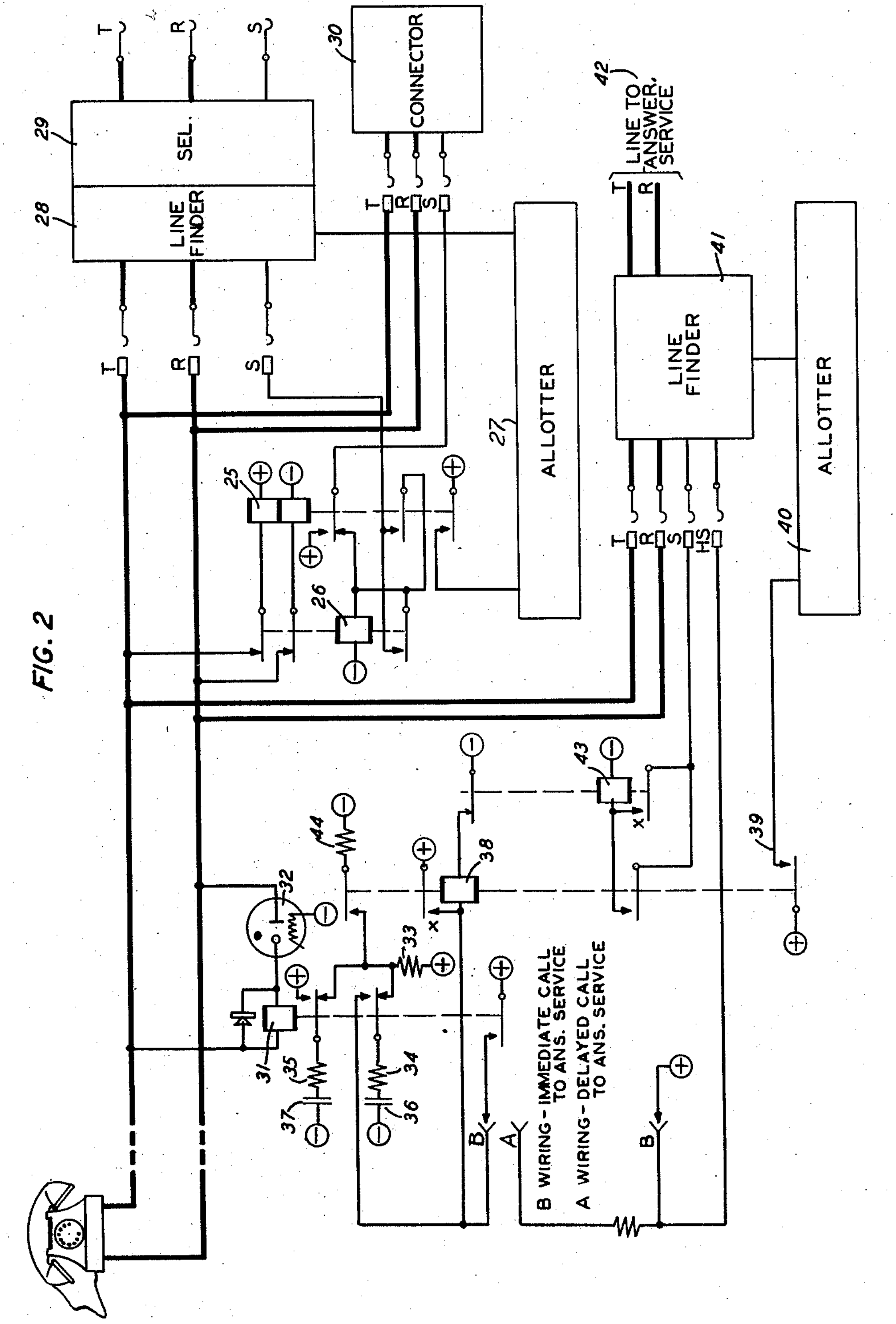

The drawings consist of two sheets having two figures as follows:

Fig. 1 is a schematic circuit diagram showing one form of the invention in which the subscriber is provided with a simple on and off switch at his substation by which he may turn this service on or off, and Fig. 2 is a schematic circuit diagram showing a second form of the invention in which the enablement of the special service circuit is delayed to give the subscriber an opportunity to answer before the call is forwarded to the answering operators.

Looking at Fig. 1 it will be seen that the conventional line circuit, line finder and selector circuits and connector circuits are provided. The line circuit consists of the usual line relay 1 and cut off relay 2 and has the tip, ring and sleeve (and perhaps also the helping sleeve) terminals appearing before a bank of line finders. When the subscriber makes a call, he operates his line relay and this relay operates an allotter 3 which starts an idle line finder 4 to seek the calling line. Busy lines will be marked with ground on their sleeve terminals and idle lines will be marked with an open connection but the calling line will be marked with battery potential obtained through the cut off relay 2. The calling line is thus picked up and extended to the selector 5 which may then be operated by the calling subscriber in a conventional manner.

On an incoming call a connector 6 will test the called line and if found idle will ground the sleeve SN terminal to operate the cut off relay and will then apply ringing current to the tip and ring conductors.

Ringing current will find a path over the tip conductor, an armature and back contact of the relay 7, through the rectifiers 8 and 9 and the two windings of the ring up relay 10, a cold cathode gas tube 11, an armature and back contact of the slow operating slave relay 12, a back contact and armature of the relay 7 to the ring conductor. The tube 11 is conventional and will pass ringing current but maintains an open circuit to the direct current applied to the line for talking and signaling. The slave relay 12 is made slow to operate by the inclusion of a thermistor 13 which may have characteristics to prevent the operation of the relay 12 on the first application of ringing current.

However, in time, relay 12 will operate and will thereupon lock to the sleeve ground and will open the circuit through the ring up relay 10 and the tube 11.

Let us first assume that the subscriber at substation 14 is near his station and does not wish to have his incoming calls diverted to the answering service. He will therefore have the switch 15 moved to "off." Therefore, when the ring up relay 10 operates it will close a circuit from the ring conductor of the line, an armature and front contact of the relay 10, a condenser 16, the upper winding of a relay 17, a front contact and armature of the relay 10, a back contact and armature of the relay 17 to the tip of the line leading to the substation 14, but the switch 15 being open this circuit will be ineffective and therefore no other operation of this circuit will take place. The ringing current on the ring of the line will, however, find a path through the subscriber's ringer 18 and the subscriber will answer in a conventional manner.

If, however, the subscriber is to be away from his station and wishes to have incoming calls diverted to an answering service, he will turn his switch 15 to "on," so that when the ring up relay 10 operates and establishes the circuit through the upper winding of the relay 17, this circuit will be completed to ground at the substation through the switch 15. The relay 17 will operate and will thereupon lock through its X contacts and its lower winding to the ground on the sleeve conductor SN. The operation of the relay 17 will ground the starting conductor 19 for the allotter 20 which will thereupon cause the line finder 21 to seek the line whose sleeve conductor is marked with battery potential, the sleeve 22, now connected through an armature and front contact of relay 17 and thence through the winding of relay 7 to battery. As the line finder 21 reaches this line the sleeve will be grounded and the relay 7 in operating will lock through its own X contacts and an armature and front contact of the relay 12.

The operation of the relay 17 also connects the relay 23 to the ground at the substation. The relay 23 also disconnects the ring up relay 10 from the tip and ring conductors when the relay 7 is operated so that upon the release of the relay 17 the relay 23 will be maintained operated in a circuit from the substation ground, normal contacts of the relay 17, an armature and back contact of the relay 10, an armature and front contact of the relay 23 and the winding thereof to battery.

The operation of the relay 7 connects the tip and ring conductors of the subscriber's line circuit to the tip and ring conductors leading to the line finder 21 so that the call may be extended to the line 24 leading to the answering service. The line leading to the subscriber's station is cut off so that the subscriber may not, by merely lifting his receiver, answer.

When the call has been completed and the connector 6 is released, ground removed from the SN sleeve conductor will release the relay 12 and the relay 7. The relay 23 will remain locked to the substation ground at the switch 15 but on the first operation of the ring up relay 10 on the next incoming call, this relay 23 will be released so that the operations above described may be carried out.

Should the subscriber return to his station and attempt to use it while his line is extended to the line 24 to the answering service, he will find his telephone "dead." However, he need only turn his switch to "off" to release the relay 23 whereupon the tip and ring conductors will be extended through back contacts of the relay 23 to his telephone, and although he is powerless to disrupt the connection established to the answering service he may nevertheless join in the conversation and may demand that the answering service operator quit her duties on this particular call.

If the subscriber is present at his station when an incoming call is received and if he moves the switch 15 to "off" and answers the call before the thermistor 13 heats sufficiently, then he will cut off any possibility of having the relay 12 operated so that the line finder 21 cannot be enabled and he will be in full charge of his incoming call.

If the subscriber at station 14 is slow in answering and the relay 12 is operated, he cannot prevent the extension of his line to the answering service, but he may nevertheless answer himself by turning the switch 15 to "off" as above explained.

While the subscriber has his switch 15 turned to off, the incoming calls may be answered in a conventional manner. On an incoming call the ring up relay will respond to ringing current long enough to cause the operation of the relay 12 which will then lock and remain operated until the line is released. The length of time it takes for the relay 12 to become operated depends on the characteristics of the thermistor 13 and this may be selected to give the subscriber a short period to answer the incoming call before the circuit for the line finder is enabled.

A second embodiment of the invention is shown in Fig. 2, and is one which has the advantage of no extra equipment at the substation. Again, means is provided whereby the subscriber by answering promptly may thwart the answering service and assume full charge of his line.

The arrangement of line circuit line relay 25, cut off relay 26, allotter 27, line finder 28, selector 29 and connector 30 is the same as before. Also, a ring up relay 31 and a cold cathode tube 32 is provided to respond to incoming ringing current as before but in this instance the circuit for this relay and tube is permanently bridged across the line.

The operation of this circuit is as follows. While the line is not being used a circuit from ground through a high resistance 33 will be connected in parallel through back contacts and armatures of the ring up relay 31 to two circuits each having a low resistance 34 and 35 respectively and a large capacity condenser 36 and 37 respectively. These condensers tend to charge in this circuit but due to the value of the resistance 33 do not attain a sufficient charge to enable the answering service operation. On a first operation of the relay 31, the condenser 36 is connected to the relay 38 but the charge in this condenser is insufficient to operate the relay 38. In the meantime the condenser 37 and the low resistance 35 is placed in a direct ground circuit whereby this condenser may be quickly and fully charged. On the release of the relay 31 the charge in condenser 37 is applied to the condenser 36 so that on a next operation of the ring up relay 31, the relay 38 may be operated. It is to be noted that through this dipper and bucket arrangement the time delay in operating the relay 38 may be controlled in any desired manner. As an extreme case the condenser 37 may be made of smaller capacity so that it would take several operations to fill the condenser 36 sufficiently to operate the relay 38. As another extreme case the indicated "B" wiring may be used to cause an immediate operation of the relay 38.

Upon the operation of relay 38, this relay operates and locks through its X contacts. Upon the resulting full operation of relay 38 the starter wire 39 for the allotter 40 is grounded and the line finder 41 is enabled to find this particular line and extend it to the line 42 to the answering service. Through the operation of the relay 38 the relay 43 will be connected to the sleeve, so that the line finder 41 will pass over all sleeve terminals characterized by ground when busy and open circuit while idle and seize the one set of terminals characterized by battery on the sleeve. On seizure the line finder will apply ground to the sleeve of this line so that the relay 43 will operate and thereupon lock to this ground through its own X contacts. The operation of the relay 43 will release the relay 38.

At the end of the use of the line the line finder 41 releases ground from the sleeve and thus the relay 43 is restored.

During the operation of the relay 38, battery potential through a comparatively low resistance 44 is applied to the condensers 36 and 37 to cause the complete discharge of both.

The arrangement of Fig. 2 has the advantage of delaying the start of the answering service circuits at least until the second ring regardless of the length of the first ring, whereas dependence on the slow acting characteristics of a thermistor is a uniform timing arrangement.

What is claimed is:

1. In a telephone system, an adapter circuit for individual association with a telephone subscriber's line, said adapter circuit having a ring up relay and an auxiliary ring up relay for isolating said ring up relay from said line, said auxiliary ring up relay being responsive to said ring up relay and having a locking circuit responsive during the continued use of said line after seizure and the application of ringing current thereto, a test relay, substation means for rendering said test relay effective, means controlled by said ring up relay for momentarily connecting said test relay to said line for the connection of ringing current thereto, line finder means for seeking said line marked by an incoming call and for extending said line to an answering service circuit and means controlled by said test relay for starting said line finder means.

2. In a telephone system, a subscriber's line having a call diversion switch controllable by a subscriber thereat for marking said line as conditioned for call diversion, a call diversion circuit inserted in said line at a central office location, said circuit having an incoming call responsive means and a test relay responsive to said responsive means and said substation switch, and call diversion means responsive to said test relay.

3. In a telephone system, a subscriber's line equipped with a call diversion marking key, a call diversion circuit inserted in said line at a central office location, an incoming call responsive relay, a test relay, a switching relay and call diversion means in said circuit, said test relay being jointly responsive to said incoming call responsive relay and said substation key, said switching relay being responsive to said test relay and having means for locking to said substation key and means in said circuit for establishing a parallel circuit to said substation for a diverted call responsive to a substation operation of said key to unlock said switching relay.

4. In a telephone system, a subscriber's line equipped with a special line circuit for controlling the extension of said line to a secretarial answering service trunk, said special line circuit having a circuit including a relay responsive to ringing current, a line relay having a locking circuit for maintaining said relay steadily operated after a first operation thereof, means controlled by said line relay for starting the operation of line extending means and means responsive to a predetermined number of operations of said first ringing current relay for triggering the operation of said line relay.

5. In a telephone system, a subscriber's line equipped with a special line circuit for controlling the extension of siad line to a secretarial answering service trunk, said special line circuit having a circuit including a relay responsive to ringing current, a line relay having a locking circuit for maintaining said relay steadily operated after a first operation thereof, means controlled by said line relay for starting the operation of line extending means and means responsive to said first ringing current relay for counting the number of applications of ringing current to said line and for triggering the operation of said line relay upon the reaching of a predetermined count.

6. In a telephone system, a subscriber's line equipped with a special line circuit for controlling the extension of said line to a secretarial answering service trunk, said special line circuit having a circuit including a relay responsive to ringing current whereby said relay will operate and release repeatedly and periodically in response to the ringing and silent intervals of the ringing circuit conventionally applied to said line, a line relay having a locking circuit for maintaining said relay steadily operated after a first operation thereof, means controlled by said line relay for starting the operation of line extending means, a cut off relay for unlocking said locked line relay upon and responsive to the extension of said line and means responsive to a predetermined one of the said periodic operations of said ringing current relay for triggering the operation of said line relay.

7. In a telephone system, a subscriber's line equipped with a special line circuit for controlling the extension of said line to a secretarial answering service trunk, a line finder having terminals of said line in its bank terminals and terminating in a said secretarial answering service trunk, said special line circuit having a circuit including a relay responsive to ringing current whereby said relay will operate and release repeatedly and periodically in response to the ringing and silent intervals of the ringing circuit conventionally applied to said line, a line relay having a locking circuit for maintaining said relay steadily operated after a first operation thereof, means controlled by said line relay for starting the operation of said line finder, a cut off relay for unlocking said locked line relay responsive to the finding of said line by said line finder, means responsive to a predetermined one of said periodic operations of said ringing current relay for triggering the operation of said line relay and means for relaying the said periodic operation of said ringing current relay into said line finder.

8. In a telephone system, a subscriber's line equipped with a special line circuit for controlling the extension of said line to a secretarial answering service trunk, a line finder having terminals of said line in its bank terminals and terminating in a said secretarial answering service trunk, said special line circuit having a circuit including a relay responsive to ringing current whereby said relay will operate and release repeatedly and periodically in response to the ringing and silent intervals of the ringing circuit conventionally applied to said line, a line relay having a locking circuit for maintaining said relay steadily operated after a first operation thereof, means controlled by said line relay for starting the operation of said line finder, a cut off relay for unlocking said locked line relay responsive to the finding of said line by said line finder, means responsive to a predetermined one of said periodic operations of said ringing current relay for triggering the operation of said line relay and a circuit including an armature and contact of said ringing current relay extending into said line finder for repeatedly and periodically signaling said line finder circuit.

References Cited in the file of this patent

UNITED STATES PATENTS

| | | |
|---|---|---|
| 1,934,949 | Powell et al. | Nov. 14, 1933 |
| 1,967,408 | Kahn | July 24, 1934 |
| 2,312,385 | Burgener | Mar. 2, 1943 |
| 2,718,560 | Alexandersson | Sept. 20, 1955 |
| 2,802,059 | Spack | Aug. 6, 1957 |